Jan. 15, 1924.
R. C. BENNER ET AL
1,481,178
ELECTRIC BATTERY
Filed Feb. 5, 1920
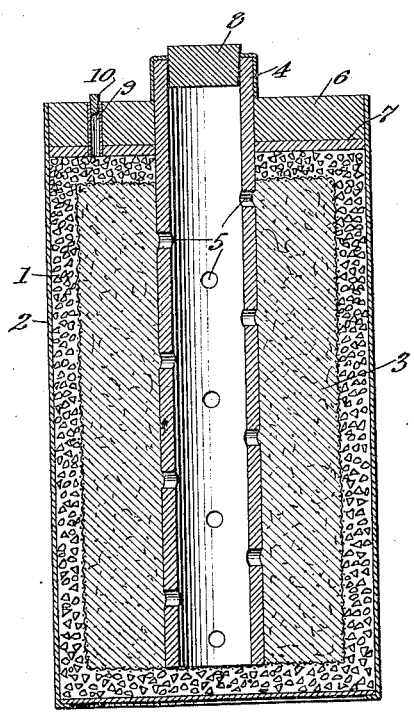

Patented Jan. 15, 1924.

1,481,178

UNITED STATES PATENT OFFICE.

RAYMOND C. BENNER AND HARRY F. FRENCH, OF FREMONT, OHIO, ASSIGNORS TO NATIONAL CARBON COMPANY, INC., A CORPORATION OF NEW YORK.

ELECTRIC BATTERY.

Application filed February 5, 1920. Serial No. 356,493.

*To all whom it may concern:*

Be it known that we, RAYMOND C. BENNER and HARRY F. FRENCH, citizens of United States, both residing at Fremont, in the county of Sandusky and State of Ohio, have invented certain new and useful Improvements in Electric Batteries, of which the following is a specification.

This invention relates to an improvement in dry cells of the deferred action type, which require some operation to be performed to place the cell in action.

In dry cells it is usual to use gelatinous substances such as cereal paste in the construction to establish intimate contact with the zinc and to separate the latter from the depolarizing mix. Generally speaking, an efficient cell of the type under consideration, in order to give good service when rendered active, should embody elements corresponding to those of the ordinary type of dry cell. Our invention relates particularly to a deferred action cell containing material capable of becoming gelatinous or forming a paste which is utilized in an advantageous manner and novel condition, as hereafter set forth.

The principal object of the invention is to utilize materials of the kind mentioned, with dry cell electrodes in deferred action cells, in such form that the mass is in such a state of aggregation as to be readily permeable and adapted to be moistened in order to activate the cell. To readily accomplish this result it is also desirable that the liquid pass through the mass before substantial gelatinization occurs.

Other objects will be referred to in the following description of a cell chosen to illustrate the invention.

The single figure of the drawing is a cross sectional view of a simple deferred action type of cell embodying the improvements.

In the construction shown by way of example, we utilize a dry granular paste-forming material, or dry substance capable of becoming gelatinous, referred to in the drawing by reference character 1. The material may be utilized in various ways, but preferably is located in the cell adjacent the depolarizing mix and zinc electrode when the cell is in an inactive condition. The material, in accordance with the invention, may consist of any of a number of gelatinizable or paste-forming substances such as corn grits or coarse corn meal, tapioca, coarse ground cereals, dry granulated uncooked flour paste, broken macaroni, agar-agar, etc. The preferred substances, however, are the paste-forming cereals, such as the coarse ground cereal mentioned. Another desirable material is a dry, granulated, uncooked paste made from a dough of wheat flour and a small amount of water, rolled, dried and pulverized.

An important characteristic of substances within the scope of the invention is that the mass is in such state of aggregation as to be readily permeable to liquids such as water or water containing electrolyte. It is, therefore, desirable in some instances to separate the fine material from the coarse grains, as too much fine material interferes with the permeability of the mass.

The particles comprising the mass are also absorbent and will gelatinize, but an aggregate will preferably be selected which is so readily permeable that the entire mass is permeated by the liquid before substantial gelatinization occurs, as the latter would impede the passage of the liquid. Gelatinization causes the particles comprising the mass to expand to produce intimate and uniform contact with the zinc electrode and depolarizing mix. This is advantageous for various reasons to all of which it is not necessary to refer specifically for an understanding of the invention. By way of illustration we may mention that the mix is securely held in position and the internal resistance is decreased.

It is also desirable to mix or combine the gelatinizable substances with electrolyte salts, in which case we prefer to use the non-hygroscopic zinc ammonium chloride electrolyte salt described in the application of D. C. Reed, Ser. No. 295,982, filed May 9, 1919. In many instances it is also desirable to add a preservative to the material, mercuric chloride being well suited for this purpose as the mercury is useful for amalgamating the zinc when the cell is in action.

In the claims and throughout the specification the term "gelatinizable" is used in a broad sense to include paste-forming materials such as the cereals, and materials which act similar to gelatine, agar-agar, etc.

In the form of cell chosen for illustration we utilize a zinc container electrode 2 having a dry molded mix bobbin 3 therein comprising carbon and manganese dioxide, with or without electrolyte salts, which is spaced from the sides and bottom.

A longitudinally perforated carbon electrode 4 located in the mix is open at both ends, and provided with a plurality of transverse perforations 5 in the portion surrounded by the mix. The latter is surrounded by the permeable, gelatinizable material previously described, which fills the space between the can and the bobbin and may extend over the top of the mix. The hollow carbon electrode projects through seal 6 and non-conducting disk 7 fitted in the upper end above the mix. A cork 8 or other closing means is provided for the opening in the projecting end of the electrode. In some instances a vent 9 having a stopper 10 is arranged in the seal to facilitate the escape of air.

To put the cell in action, liquid is added through the opening in the upper end of the hollow carbon electrode to fill the hollow electrode and the space containing the gelatinizable substance and electrolyte. The stopper 10 will be temporarily removed to facilitate the escape of the air which is displaced by the liquid. The activating liquid which is poured into the electrode first passes through the pervious material at the bottom and then passes into permeable mass at the sides. If liquid is permitted to pass into the mass from the top, air is likely to be trapped therein and prevent uniform distribution of the liquid. The composition and quantity of the liquid added will be dependent upon the character of the mix and pervious material. The liquid permeates the pervious material in a short time and the cell is ready for immediate action, although the mass is not immediately gelatinized. The mix itself also is not moistened thoroughly until the liquid in the hollow electrode has had time to permeate therethrough. After filling the cell, the open end of the electrode and vent 9 are again closed without waiting for the mix to become moistened or the permeable mass to become gelatinous.

The activating liquid added causes the paste-forming material to swell but the swelling action due to the gelatinization, does not occur quickly enough to prevent liquid from permeating the granular mass. After the swelling has occurred, however, it has been found that the bobbin is held so tightly in the can that it can be withdrawn only by application of considerable force, even when the retaining seal 6 is removed. When a granular mass containing electrolyte is used, the latter accelerates the swelling and gelatinization of the permeable material.

In the ordinary deferred action cells having a zinc container, a lining of bibulous material, a coating of dried paste therebetween, a mix, and a hollow carbon electrode for adding electrolyte thereto, it is necessary to wait until the liquid poured in the hollow electrode soaks through the mix, lining and flour, and reaches the zinc, before the cell is ready for action. This usually requires several hours and repeated filling. With a cell utilizing paste-forming materials of such form that the mass is readily permeable, it is unnecessary to wait for the liquid to soak into the mix as the cell is active as soon as the material surrounding the mix is moistened. The requisite moistening of the mix itself will occur while the cell is in service.

It will be understood that the application of a readily permeable gelatinizable mass to deferred action dry cells is not necessarily limited to any particular structural details, although the cell described illustrates by way of example a satisfactory arrangement for utilizing the material.

Having described our invention, what we claim is:—

1. In a dry cell having a depolarizer and an anode spaced therefrom, a readily permeable mass between said depolarizer and anode, and comprising particles of gelatinizable material.

2. A dry cell in accordance with claim 1 in which the mass is substantially dry.

3. A dry cell in accordance with claim 1 in which the mass comprises dry granular cereals.

4. A dry cell in accordance with claim 1, in which the mass comprises electrolyte salts.

5. A dry cell in accordance with claim 1, in which the mass comprises a substantially dry non-hygroscopic electrolyte salt.

6. In us of the type described, a depolarizing mix, a negative electrode and readily permeable mass comprising particles of gelatinizable material intermediate the mix and negative electrode.

7. In cells of the type described, a depolarizing mix, a zinc container electrode and a readily permeable mass comprising particles of gelatinizable material intermediate to the zinc electrode and depolarizing mix, said cell having an opening for applying an activating material to the permeable mass.

8. In cells of the type described, a zinc container electrode, a longitudinally perforated carbon electrode having transverse passages, a mix surrounding the carbon electrode and covering each of the transverse passages, and a readily permeable mass comprising particles of gelatinizable material intermediate the mix and negative electrode.

9. In dry cells of the type described, a depolarizing mix, a zinc container electrode, and a readily permeable mass comprising particles of gelatinizable material between the mix and zinc electrode, said cell having two openings, one for applying an activating liquid to the permeable mass and the other adapted to permit air to escape from the cell.

10. In cells of the type described, a depolarizing mix, a zinc container electrode, a readily permeable mass comprising particles of gelatinizable material between the mix and zinc electrode and covering the lower end of the mix, and a hollow perforated positive electrode in the mix having an opening at both ends, the lower end adjoining the pervious mass located at the lower end at the mix.

In testimony whereof, we affix our signatures.

RAYMOND C. BENNER.
HARRY F. FRENCH.